(12) United States Patent
Völcker et al.

(10) Patent No.: US 12,739,340 B2
(45) Date of Patent: Sep. 15, 2026

(54) GENERATING A VIRTUAL PRESENTATION STAGE FOR PRESENTATION IN A USER INTERFACE OF A VIDEO CONFERENCE

(71) Applicant: Google LLC, Mountain View, CA (US)

(72) Inventors: Patrick Axel Völcker, Hamburg (DE); Irina Dietrich, Hamburg (DE); Ryan Hamilton Nelson, Walnut Creek, CA (US); Harbir Singh Bharaj, Henstedt-Ulzburg (DE); Jörg Hösel, Hamburg (DE)

(73) Assignee: Google LLC, Mountain View, CA (US)

( * ) Notice: Subject to any disclaimer, the term of this patent is extended or adjusted under 35 U.S.C. 154(b) by 105 days.

(21) Appl. No.: 18/369,279

(22) Filed: Sep. 18, 2023

(65) Prior Publication Data

US 2025/0097375 A1 Mar. 20, 2025

(51) Int. Cl.
*H04N 5/272* (2006.01)

(52) U.S. Cl.
CPC .................................. *H04N 5/272* (2013.01)

(58) Field of Classification Search
CPC ...................................................... H04N 5/272
See application file for complete search history.

(56) References Cited

U.S. PATENT DOCUMENTS 7,363,589 B1 4/2008 Maeng
8,754,927 B2 * 6/2014 Fritsch .................. H04N 7/144 348/14.08
9,325,939 B2 * 4/2016 Schultz .............. H04L 65/1083
9,875,224 B1 * 1/2018 VanBlon ............... G06F 40/103
11,412,180 B1 * 8/2022 Mayfield .................. H04N 7/15
12,028,389 B1 * 7/2024 Huggar ................. H04L 65/403
12,107,906 B2 * 10/2024 Agrawal ................ H04N 7/147
2010/0037151 A1 2/2010 Ackerman et al.
2015/0373303 A1 * 12/2015 Visosky .............. H04N 23/611 348/14.05

(Continued)

FOREIGN PATENT DOCUMENTS

WO 2023075909 A1 5/2023

OTHER PUBLICATIONS

International Search Report and Written Opinion for International Application No. PCT/US2024/047108, mailed Dec. 9, 2024, 14 Pages.

*Primary Examiner* — Olisa Anwah
(74) *Attorney, Agent, or Firm* — Lowenstein Sandler LLP

(57) ABSTRACT

Systems and methods for generating a virtual presentation stage for presentation in a user interface of a video conference are provided. A first participant video stream representing a first participant of a plurality of participants of a video conference is received from a camera of a first client device of the first participant. A combined video stream is created comprising a background image, one or more images representing one or more content items presentable by the first participant during the video conference, the first participant video stream, and one or more teleprompter notes associated with at least one of the one or more content items. A user interface (UI) is provided for display on the first client device of the first participant, wherein the UI comprises a visual item corresponding to the combined video stream while the first participant is presenting at least one of the one or more content items to one or more other participants of the video conference.

20 Claims, 6 Drawing Sheets

(56) References Cited

U.S. PATENT DOCUMENTS

| | | | | |
|---|---|---|---|---|
| 2018/0070026 | A1* | 3/2018 | Nussbaum | G06F 3/0304 |
| 2022/0247940 | A1* | 8/2022 | Springer | H04N 5/272 |
| 2022/0286625 | A1* | 9/2022 | Afrasiabi | H04N 7/147 |
| 2022/0353466 | A1 | 11/2022 | Mayfield | |
| 2023/0126024 | A1 | 4/2023 | Goh et al. | |
| 2023/0127120 | A1* | 4/2023 | Chandran | G11B 27/031<br>348/722 |
| 2023/0208894 | A1 | 6/2023 | Iitsuka et al. | |

* cited by examiner

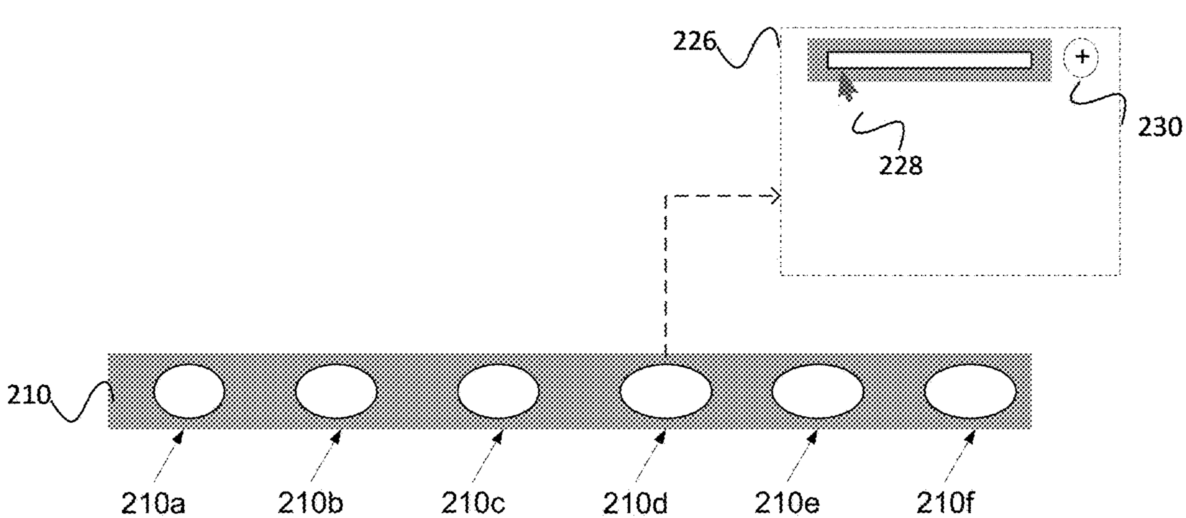
FIG. 2C

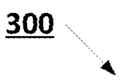

Receive, from a camera of a first client device of a first participant of a plurality of participants of a video conference, a first participant video stream representing the first participant 310

Create a combined video stream comprising a background image, one or more images representing one or more content items presentable by the first participant during the video conference, the first participant video stream, and one or more teleprompter notes associated with at least one of the one or more content items 320

Provide, for display on the first client device of the first participant, a user interface (UI) comprising a visual item corresponding to the combined video stream while the first participant is presenting at least one of the one or more content items to one or more other participants of the video conference 330

FIG. 3

GENERATING A VIRTUAL PRESENTATION STAGE FOR PRESENTATION IN A USER INTERFACE OF A VIDEO CONFERENCE

TECHNICAL FIELD

Aspects and implementations of the present disclosure relate to generating a virtual presentation stage for presentation in a user interface of a video conference.

BACKGROUND

Video conferences can take place between multiple participants via a video conference platform. A video conference platform includes tools that allow multiple client devices to be connected over a network and share each other's audio (e.g., voice of a user recorded via a microphone of a client device) and/or video stream (e.g., a video captured by a camera of a client device, or video captured from a screen image of the client device) for communication. To this end, the video conference platform can provide a user interface that includes visual items to display the video stream of each participating client device. In some instances, a participant of a video conference may want to present content to other participants.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

An aspect of the disclosure provides a computer-implemented method that includes receiving from a camera of a first client device of a first participant of a plurality of participants of a video conference, a first participant video stream representing the first participant. The method further includes creating a combined video stream comprising a background image, one or more images representing one or more content items presentable by the first participant during the video conference, the first participant video stream, and one or more teleprompter notes associated with at least one of the one or more content items. The method further includes providing, for display on the first client device of the first participant, a user interface (UI) comprising a visual item corresponding to the combined video stream while the first participant is presenting at least one of the one or more content items to one or more other participants of the video conference.

In some implementations, the one or more images representing the one or more content items are overlaid over the background image in the combined video stream, the first participant video stream is overlaid over at least a part of the background image, and the one or more teleprompter notes are overlaid over at least a part of a content item of the one or more content items in the combined video stream.

In some implementations, combining the background image, the one or more images representing the one or more content items, the first participant video stream, and the one or more teleprompter notes is performed by a driver associated with the camera of the first client device.

In some implementations, the method further includes receiving, via the UI, input of the first participant to identify the one or more content items. The method further includes obtaining, via an application programming interface (API) to a content editing application, the one or more content items and the one or more teleprompter notes associated with the at least one of the one or more content items.

In some implementations, the content item is one of a document, a spreadsheet, a set of slides, or a multimedia content item.

In some implementations, the method further includes receiving, from one or more client devices associated with other participants of the video conference, one or more other participant video streams. The method further includes adding, to the UI displayed on the first client device of the first participant, one or more visual items corresponding to the one or more other participant video streams.

In some implementations, a second UI displayed on each of the one or more client devices associated with the other participants of the video conference comprises a visual item corresponding to a second combined video stream comprising the background image, an image representing one of the one or more content items being presented by the first participant and the first participant video stream, wherein the one or more teleprompter notes associated with the at least one of the one or more content items are not visible on the second UI displayed on each of the one or more client devices associated with the other participants of the video conference.

In some implementations, the method further includes upon a selection of a control UI element in the UI by the first participant, modifying a visual representation of the at least one content item of the one or more content items. The method further includes modifying at least one teleprompter note of the one or more teleprompter notes associated with the at least one content item.

An aspect of the disclosure provides a system including a memory device and a processing device communicatively coupled to the memory device. The processing device performs operations including receiving, from a camera of a first client device of a first participant of a plurality of participants of a video conference, a first participant video stream representing the first participant. The processing device performs operations further including creating a combined video stream comprising a background image, one or more images representing one or more content items presentable by the first participant during the video conference, the first participant video stream, and one or more teleprompter notes associated with at least one of the one or more content items. The processing device performs operations further including providing, for display on the first client device of the first participant, a user interface (UI) comprising a visual item corresponding to the combined video stream while the first participant is presenting at least one of the one or more content items to one or more other participants of the video conference.

In some implementations, the one or more images representing the one or more content items are overlaid over the background image in the combined video stream, the first participant video stream is overlaid over at least a part of the background image, and the one or more teleprompter notes are overlaid over at least a part of a content item of the one or more content items in the combined video stream.

In some implementations, combining the background image, the one or more images representing the one or more content items, the first participant video stream, and the one or more teleprompter notes is performed by a driver associated with the camera of the first client device.

In some implementations, the processing device performs operations further including receiving, via the UI, input of the first participant to identify the one or more content items; and obtaining, via an application programming interface (API) to a content editing application, the one or more content items and the one or more teleprompter notes associated with the at least one of the one or more content items.

In some implementations, the content item is one of a document, a spreadsheet, a set of slides, or a multimedia content item.

In some implementations, the processing device performs operations further including receiving from one or more client devices associated with other participants of the video conference, one or more other participant video streams; and adding, to the UI displayed on the first client device of the first participant, one or more visual items corresponding to the one or more other participant video streams.

In some implementations, a second UI displayed on each of the one or more client devices associated with the other participants of the video conference comprises a visual item corresponding to a second combined video stream comprising the background image, an image representing one of the one or more content items being presented by the first participant and the first participant video stream, wherein the one or more teleprompter notes associated with the at least one of the one or more content items are not visible on the second UI displayed on each of the one or more client devices associated with the other participants of the video conference.

In some implementations, the processing device performs operations further including upon a selection of a control UI element in the UI by the first participant, modifying a visual representation of the at least one content item of the one or more content items; and modifying at least one teleprompter note of the one or more teleprompter notes associated with the at least one content item.

An aspect of the disclosure provides a computer program including instructions that, when the program is executed by a processing device, cause the processing device to perform operations including receiving, from a camera of a first client device of a first participant of a plurality of participants of a video conference, a first participant video stream representing the first participant. The processing device performs operations further including creating a combined video stream comprising a background image, one or more images representing one or more content items presentable by the first participant during the video conference, the first participant video stream, and one or more teleprompter notes associated with at least one of the one or more content items. The processing device performs operations further including providing, for display on the first client device of the first participant, a user interface (UI) comprising a visual item corresponding to the combined video stream while the first participant is presenting at least one of the one or more content items to one or more other participants of the video conference.

In some implementations, the one or more images representing the one or more content items are overlaid over the background image in the combined video stream, the first participant video stream is overlaid over at least a part of the background image, and the one or more teleprompter notes are overlaid over at least a part of a content item of the one or more content items in the combined video stream.

In some implementations, combining the background image, the one or more images representing the one or more content items, the first participant video stream, and the one or more teleprompter notes is performed by a driver associated with the camera of the first client device.

In some implementations, the processing device performs operations further including receiving, via the UI, input of the first participant to identify the one or more content items; and obtaining, via an application programming interface (API) to a content editing application, the one or more content items and the one or more teleprompter notes associated with the at least one of the one or more content items.

In some implementations, the content item is one of a document, a spreadsheet, a set of slides, or a multimedia content item.

In some implementations, the processing device performs operations further including receiving from one or more client devices associated with other participants of the video conference, one or more other participant video streams; and adding, to the UI displayed on the first client device of the first participant, one or more visual items corresponding to the one or more other participant video streams.

In some implementations, a second UI displayed on each of the one or more client devices associated with the other participants of the video conference comprises a visual item corresponding to a second combined video stream comprising the background image, an image representing one of the one or more content items being presented by the first participant and the first participant video stream, wherein the one or more teleprompter notes associated with the at least one of the one or more content items are not visible on the second UI displayed on each of the one or more client devices associated with the other participants of the video conference.

In some implementations, the processing device performs operations further including upon a selection of a control UI element in the UI by the first participant, modifying a visual representation of the at least one content item of the one or more content items; and modifying at least one teleprompter note of the one or more teleprompter notes associated with the at least one content item.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

FIG. 2C illustrates another example UI of a video conference, in accordance with implementations of the present disclosure.

FIG. 3 depicts a flow diagram of a method for generating a virtual presentation stage for presentation in a UI of a video conference, in accordance with implementations of the present disclosure.

DETAILED DESCRIPTION

Figure 1:
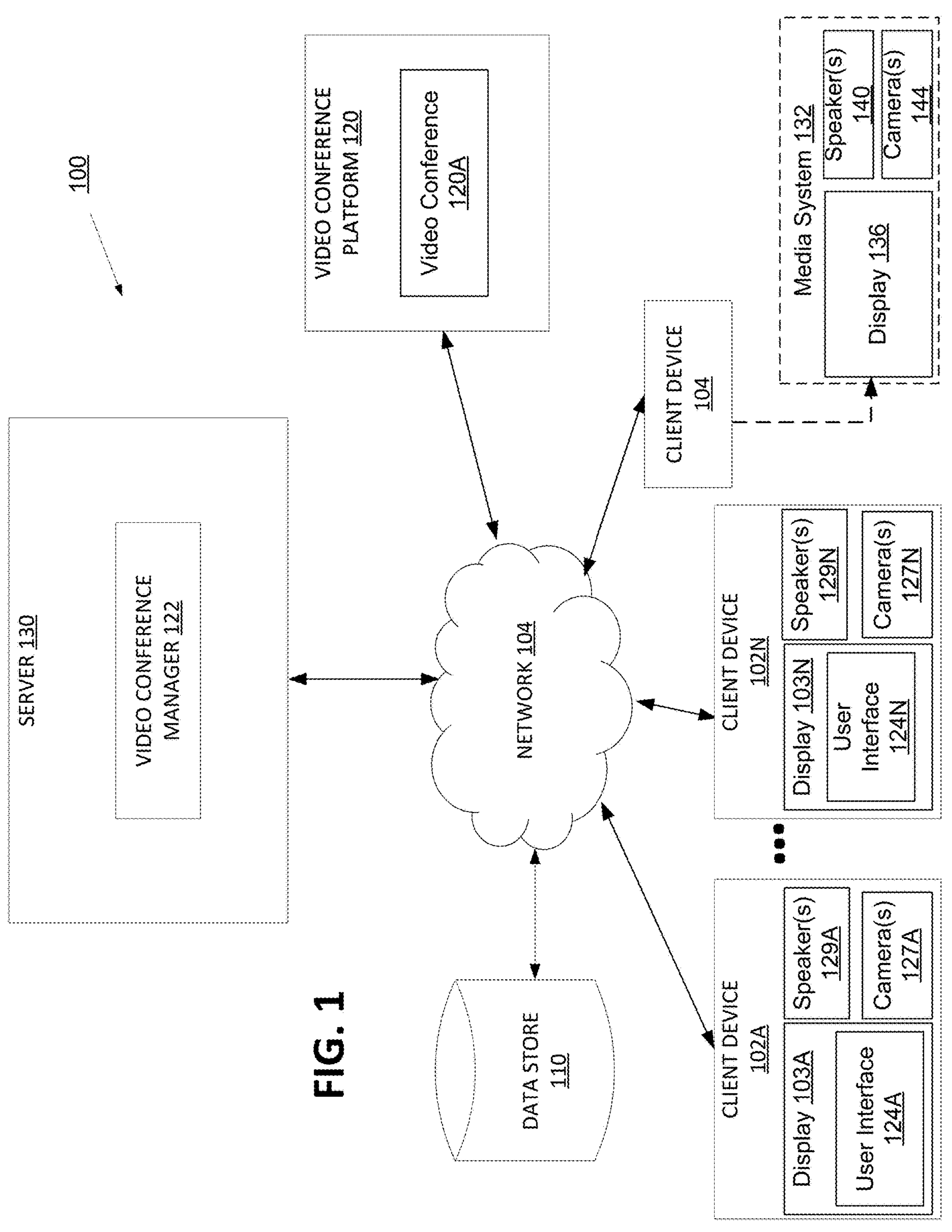
FIG. 1 illustrates an example system architecture, in accordance with implementations of the present disclosure.

Aspects of the present disclosure relate to generating a virtual presentation stage for presentation in a UI of a video conference platform. A video conference platform can enable video-based conferences between multiple participants via respective client devices that are connected over a network and share each other's audio (e.g., voice of a user recorded via a microphone of a client device) and/or video streams (e.g., a video captured by a camera of a client device) during a video conference. In some instances, a video conference platform can enable a significant number of client devices (e.g., up to one hundred or more client devices) to be connected via the video conference.

A participant (also referred to herein as a "speaker") of a video conference can speak (e.g., present on a topic) to the other participants of the video conference. Some existing video conference platforms can provide a user interface (UI) to each client device connected to the video conference, where the UI displays the video streams shared over the network in a set of visual items positioned in a set of regions in the UI. For example, the video stream of a participant who is speaking to the other participants in the video conference can be displayed in a designated visual item in the UI of the video conference platform. In some instances, the speaker may want to share content with the other participants. For example, the speaker may want to share presentation slides, videos, or other documents with the other participants, such as to aid, visualize, or supplement the speaker's presentation.

In conventional video conference platforms, when a speaker shares content with other participants, the speaker's video stream and other participants' video streams can typically be presented in small-sized windows (e.g., visual items) in a corner, side, or bottom region in the UI, while another video stream with the shared content can be presented in a large-sized window (e.g., visual item) in a center region in the UI. In other conventional video conference platforms, the video stream of the speaker's shared content can be presented in full-screen size in the UI, while the speaker's video stream can be invisible in the UI to the other participants. As a result, during a presentation, the speaker's shared content is often the main focus in the UI, while the speaker and other participants are, at most, visible in a small-sized window in the UI or not visible at all in the UI. This can impact the speaker's ability to effectively communicate with the other participants, as well as the other participants' ability to effectively understand the speaker and the speaker's presentation. In particular, there are instances during a presentation when non-verbal communication (e.g., facial expressions, hand gestures, etc.) is important for fully communicating or understanding the presentation. For example, a speaker may want to point to a particular part of a slide during a presentation, or the speaker may want to express a particular emotion while presenting on a particular topic. In other examples, a speaker may want to see the facial expressions of the other participants during the presentation (e.g., to see whether the other participants appear bored, confused, etc.), or the speaker may want to see whether any of the other participants are raising their hands to ask questions or make comments. In addition, as the speaker typically reads directly from their notes or their shared content (e.g., slides, documents, etc.) while presenting, the speaker does not look at their camera often or at all during the presentation and thus loses their direct connection to the audience (e.g., the other participants). Consequently, both the speaker and the other participants can miss out on critical communication during the video conference—an important need in video conferencing, particularly given the current world of hybrid work. Further, when presenting shared content, the speaker can typically only share one content item, such as a presentation slide, a video, or a document, but not a combination of multiple content items within the same video stream. This can disrupt the video conference flow for the speaker who has to pause their presentation to change the content they want to share, and it can also disrupt the video conference flow for the other participants who may have to wait while the speaker changes the shared content during the presentation. As a result, the speaker and/or participants would need to perform further tasks to ensure that appropriate video streams are presented at various moments during the presentation in the video conference, which would result in unnecessary consumption of computing resources, thereby decreasing overall efficiency and increasing overall latency of the video conference platform.

Implementations of the present disclosure address the above and other deficiencies by generating a virtual presentation stage for presenting content in a user interface (UI) of a video conference platform during a video conference. A video stream of a participant of the conference (e.g., a speaker) can be received from a camera of a respective client device of the participant. A combined video stream can be created that includes a background image, one or more images that represent one or more content items that the speaker may want to share with other participants during the video conference (e.g., a presentation slide, a document, a video item, an audio item, a link to a website, etc.), the speaker's video stream, and teleprompter notes that the speaker may have for one or more of the content items. In the combined video stream, the one or more images representing the one or more content items can be overlaid over the background image, the speaker's video stream can be overlaid over at least a part of the background image, and the teleprompter notes can be overlaid at least over a part of a content item (e.g., at a location that allows the speaker to speak easily, focus on presentation, and appear to be looking at the camera). A user interface (UI) can be provided for display on the first client device, where the UI includes a visual item to display the combined video stream to the speaker while the speaker is presenting the one or more content items to other participants of the video conference. There can further be another (e.g., a second) UI that is provided for display on one or more client devices associated with the other participants of the video conference, where the second UI includes a visual item that displays another combined video stream including the aforementioned background image, one or more images that representing the one or more content items being presented by the speaker, and the speaker's video stream, and where the teleprompter notes are not visible in the second UI to the other participants. Thus, the speaker and other participants of the video conference can efficiently participate in the video conference with improved communication and a reduced number of distractions due to a more suitable presentation in the UI that provides for a more interactive, dynamic, and rich presentation experience. For example, the speaker can better communicate and connect with the other participants of the video conference while presenting shared content by having the aid of teleprompter notes overlaid over the speaker's shared content. In addition, the other participants can also better communicate and connect with the speaker by being able to see both the speaker and the shared content within the same visual item (e.g., within the same video stream) during the video conference.

Aspects of the present disclosure provide technical advantages over previous solutions. Aspects of the present disclosure can provide an additional functionality to the video conference tool of the video conference platform that creates combined video streams for presentation to participants of a video conference, where the combined video stream overlays images representing a background image, content items presentable by a speaker during the video conference, the speaker's video conference, and teleprompter notes for the speaker to use during the presentation, where the teleprompter notes are only visible to the speaker but not to the other participants, as described in more details herein. Such additional functionality can also result in more efficient use of processing resources utilized to facilitate the connection between client devices by avoiding consumption of computing resources needed to support participants (e.g., speakers) manually managing the sharing of and the switching back and forth among different content items and teleprompter notes during presentation, thereby resulting in an increase of overall efficiency and a decrease in overall latency of the video conference platform.

FIG. 1 illustrates an example system architecture 100, in accordance with implementations of the present disclosure. The system architecture 100 (also referred to as "system" herein) includes client devices 102A-N, one or more client devices 104, a data store 110, a video conference platform 120, and a server 130, each connected to a network 104.

In implementations, network 104 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. A data item can include audio data and/or video stream data, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that may be hosted by video conference platform 120 or one or more different machines (e.g., the server 130) coupled to the video conference platform 120 via network 104. In some implementations, the data store 110 can store portions of audio and video streams received from the client devices 102A-102N for the video conference platform 120. Moreover, the data store 110 can store various types of documents, such as a slide presentation, a text document, a spreadsheet, or any suitable electronic document (e.g., an electronic document including text, tables, videos, images, graphs, slides, charts, software programming code, designs, lists, plans, blueprints, maps, etc.). These documents may be shared with users of the client devices 102A-102N and/or concurrently editable by the users.

Video conference platform 120 can enable users of client devices 102A-102N and/or client device(s) 104 to connect with each other via a video conference (e.g., a video conference 120A). A video conference refers to a real-time communication session such as a video conference call, also known as a video-based call or video chat, in which participants can connect with multiple additional participants in real-time and be provided with audio and video capabilities. Real-time communication refers to the ability for users to communicate (e.g., exchange information) instantly without transmission delays and/or with negligible (e.g., milliseconds or microseconds) latency. Video conference platform 120 can allow a user to join and participate in a video conference call with other users of the platform. Embodiments of the present disclosure can be implemented with any number of participants connecting via the video conference (e.g., up to one hundred or more).

The client devices 102A-102N may each include computing devices such as personal computers (PCs), laptops, mobile phones, smart phones, tablet computers, netbook computers, network-connected televisions, etc. In some implementations, client devices 102A-102N may also be referred to as "user devices." Each client device 102A-102N can include an audiovisual component that can generate audio and video data to be streamed to video conference platform 120. In some implementations, the audiovisual component can include a device (e.g., a microphone) to capture an audio signal representing speech of a user and generate audio data (e.g., an audio file or audio stream) based on the captured audio signal. The audiovisual component can include another device (e.g., a speaker 129A-129N) to output audio data to a user associated with a particular client device 102A-102N. In some implementations, the audiovisual component can also include an image capture device (e.g., a camera 127A-127N) to capture images and generate video data (e.g., a video stream) of the captured data of the captured images. In some implementations, the image capture device can be controlled by an image capture device driver (also referred to herein as "driver" or "camera driver") that is configured to control the image capture device. The driver can be a software component included in each client device 102A-102N that interfaces between an operating system (OS) of each client device 102A-102N and each of the camera(s) 127A-127N.

In some embodiments, video conference platform 120 is coupled, via network 104, with one or more client devices 104 that are each associated with a physical conference or meeting room. Client device(s) 104 may include or be coupled to a media system 132 that may comprise one or more display devices 136, one or more speakers 140 and one or more cameras 144. Display device 136 can be, for example, a smart display or a non-smart display (e.g., a display that is not itself configured to connect to network 104). Users that are physically present in the room can use media system 132 rather than their own devices (e.g., client devices 102A-102N) to participate in a video conference, which may include other remote users. For example, the users in the room that participate in the video conference may control the display 136 to show a presentation (e.g., a slide presentation) or watch presentations of other participants. Sound and/or camera control can similarly be performed. Similar to client devices 102A-102N, client device(s) 104 can generate audio and video data to be streamed to video conference platform 120 (e.g., using one or more microphones, speakers 140, and cameras 144).

Each client device 102A-102N or 104 can include a web browser and/or a client application (e.g., a mobile application, a desktop application, etc.). In some implementations, the web browser and/or the client application can present, on a display device 103A-103N of client device 102A-102N, a user interface (UI) (e.g., a UI of the UIs 124A-124N) for users to access video conference platform 120. For example, a user of client device 102A can join and participate in a video conference via a UI 124A presented on the display device 103A by the web browser or client application. A user can also present content items (e.g., a document, a slide, a video, etc.) to participants of the video conference via each of the UIs 124A-124N. Each of the UIs 124A-124N can include multiple regions to present visual items corresponding to video streams of the client devices 102A-102N provided to the server 130 for the video conference.

In some implementations, server 130 can include a video conference manager 122. Video conference manager 122 is configured to manage a video conference between multiple users of video conference platform 120. In some implementations, video conference manager 122 can provide the UIs 124A-124N to each client device to enable users to watch and listen to each other during a video conference. Video conference manager 122 can also collect and provide data associated with the video conference to each participant of the video conference. In some implementations, video conference manager 122 can provide the UIs 124A-124N for presentation by a client application (e.g., a mobile application, a desktop application, etc.). For example, the UIs 124A-124N can be displayed on a display device 103A-103N by a native application executing on the operating system of the client device 120A-120N or the client device 104. The native application may be separate from a web browser.

In some embodiments, the video conference manager 122 can provide visual items for presentation in the UI 124A-124N during a video conference. A visual item can refer to a UI element that occupies a particular region in the UI and is dedicated to presenting a video stream from a respective client device. Such a video stream can depict, for example, a user of the respective client device while the user is participating in the video conference (e.g., speaking, presenting, listening to other participants, watching other participants, etc., at particular moments during the video conference), a physical conference or meeting room (e.g., with one or more participants present), a document or media content (e.g., video content, one or more images, etc.) being presented during the video conference, etc.

As described previously, an audiovisual component of each client device can capture images and generate video data (e.g., a video stream) of the captured data of the captured images. In some implementations, the client devices 102A-102N and/or client device(s) 104 can transmit the generated video stream to video conference manager 122. The audiovisual component of each client device can also capture an audio signal representing speech of a user and generate audio data (e.g., an audio file or audio stream) based on the captured audio signal. In some implementations, the client devices 102A-102N and/or client device(s) 104 can transmit the generated audio data to video conference manager 122.

In some implementations, video conference platform 120 and/or server 130 can be one or more computing devices computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to enable a user to connect with other users via a video conference. Video conference platform 120 may also include a website (e.g., a webpage) or application back-end software that may be used to enable a user to connect with other users via the video conference.

It should be noted that in some other implementations, the functions of server 130 or video conference platform 120 may be provided by a fewer number of machines. For example, in some implementations, server 130 may be integrated into a single machine, while in other implementations, server 130 may be integrated into multiple machines. In addition, in some implementations, server 130 may be integrated into video conference platform 120.

In general, functions described in implementations as being performed by video conference platform 120 or server 130 can also be performed by the client devices 102A-N and/or client device(s) 104 in other implementations, if appropriate. In addition, the functionality attributed to a particular component can be performed by different or multiple components operating together. Video conference platform 120 and/or server 130 can also be accessed as a service provided to other systems or devices through appropriate application programming interfaces, and thus is not limited to use in websites.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline, such as a topic channel, of the video conference platform 120.

In situations in which the systems discussed here collect personal information about users, or may make use of personal information, the users may be provided with an opportunity to control whether video conference platform 120 collects user information (e.g., information about a user's social network, social actions or activities, profession, a user's preferences, or a user's current location), or to control whether and/or how to receive content from the server 130 that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the video conference platform 120 and/or server 130.

Figure 2A:
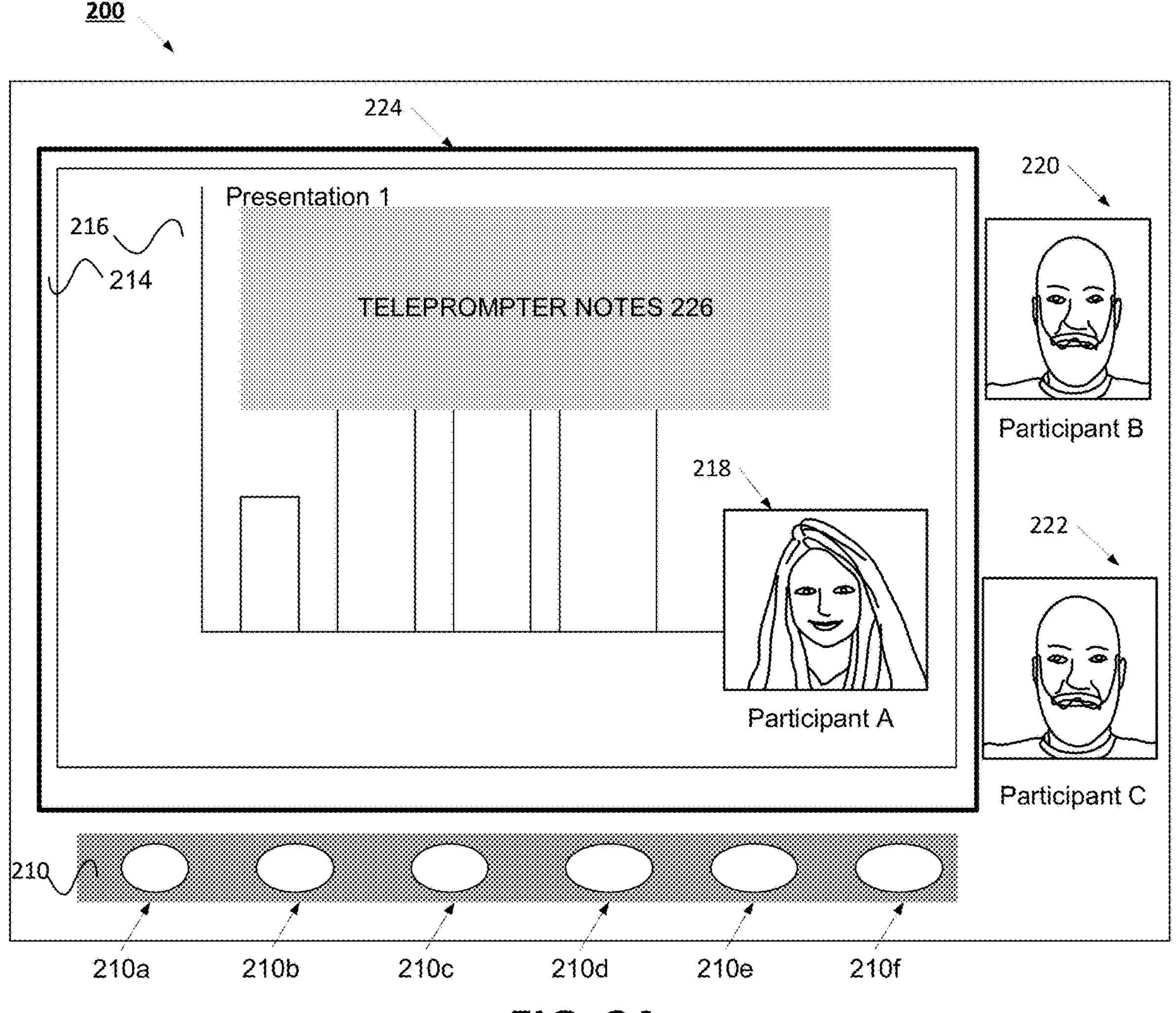
FIG. 2A illustrates an example user interface (UI) of a video conference, in accordance with implementations of the present disclosure.

FIG. 2A illustrates an example user interface (UI) of a video conference, in accordance with implementations of the present disclosure. The UI 200 can be generated by the video conference manager 122 of FIG. 1 for presentation at a client device (e.g., client devices 102A-102N and/or 104). Accordingly, the UI 200 can be generated by one or more processing devices of the server 130 of FIG. 1. In some implementations, the video conference between multiple participants can be managed by the video conference platform 120. As illustrated, the video conference manager 122 can provide the UI 200 to enable participants (e.g., participants A-C) to join and participate in the video conference. Alternatively, the UI 200 can be generated by a video conferencing application hosted by the client device (e.g., client devices 102A-102N and/or 104). For example, the video conferencing application can generate the UI 200 using a camera driver of the client device, as discussed in more detail herein.

Figure 2B:
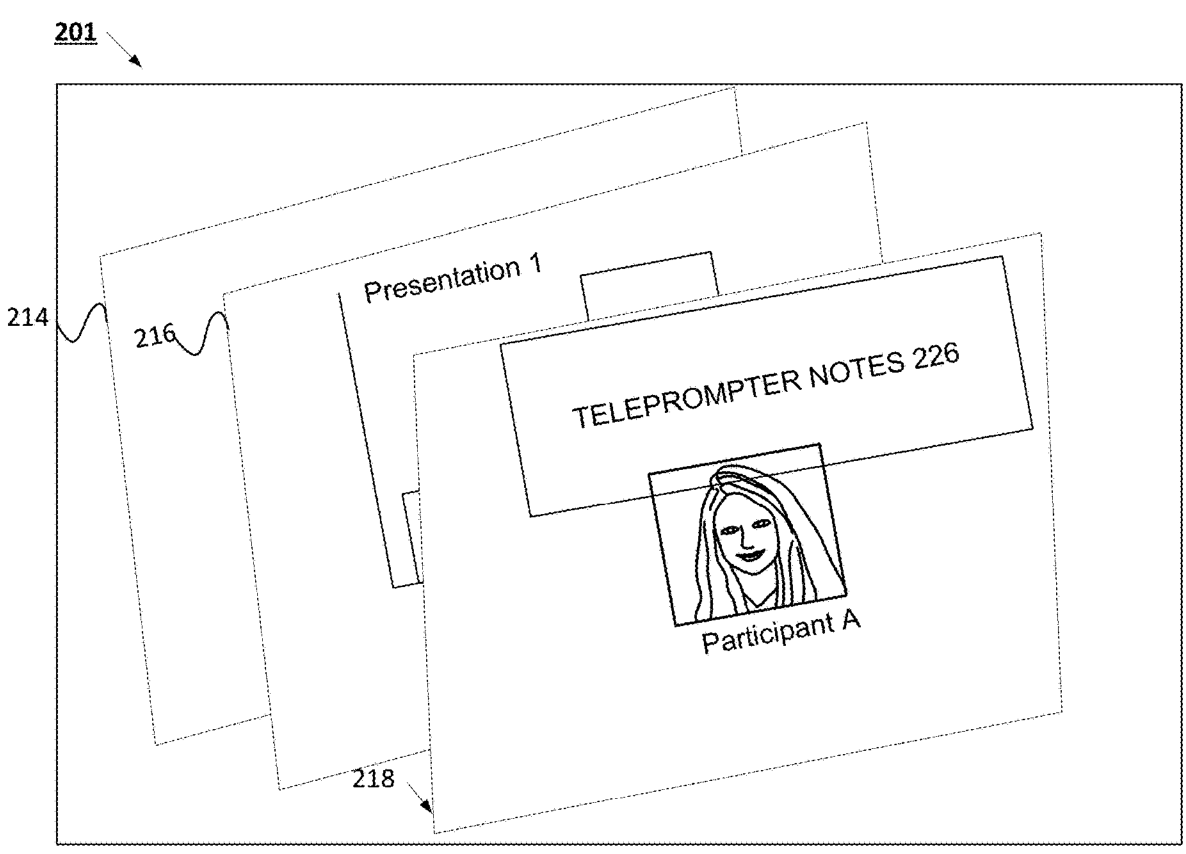
FIG. 2B illustrates another example UI of a video conference, in accordance with implementations of the present disclosure.

FIG. 2B illustrates another example UI of a video conference, in accordance with implementations of the present disclosure.

FIG. 2C illustrates another example UI of a video conference, in accordance with implementations of the present disclosure.

Referring to FIG. 2A, the UI 200 can include multiple regions, including a first region 224, a second region 220, and a third region 222.

The first region 224 displays a visual item corresponding to video data (e.g., a video stream) of a set of content items being presented by a participant (e.g., Participant A) of a video conference. A content item can be a slide presentation, a word document, a spreadsheet document, a multimedia content item, a web page, or any other document that can be presented. In one implementation, a client device can obtain the set of content items via an appropriate application programming interface (API) to a content editing application. The content editing application can be an application that provides a set of tools for editing content items, such as a document editing application, a slide presentation editing application, a video editing application, etc. In some examples, the content editing application can be a web-based application with an API component that allows the client device to access the content editing application and obtain one or more content items from the content editing application. In some implementations, the client device can further obtain one or more teleprompter notes that are associated with one or more content items of the set of content items from the content editing application. The one or more teleprompter notes can be, for example, one or more sets of notes that the participant prepared to read from during presentation of the one or more content items during the video conference. As an example, the client device can obtain, via the API component of the content editing application, a slide presentation that was prepared by the participant using the content editing application. The client device can further obtain, via the API component, a set of teleprompter notes that are stored in a document or file related to the slide presentation and/or within the slide presentation on the content editing application. For example, a machine learning model can be trained to perform optical character recognition (OCR) and/or natural language processing (NLP) to identify relevant notes (e.g., the set of teleprompter notes) within documents and/or content items stored on the content editing application. For example, the machine learning model can be a deep neural network, such as a convolutional neural network, which can be trained using supervised learning on a labeled dataset containing images of characters or text. The machine learning model can thus be trained to map the input dataset containing images to corresponding labels of characters and/or texts. In some implementations, the machine learning model can be stored on the server 130 of FIG. 1 or can be stored as part of the client application of the client device.

In some implementations, the first region 224 can be used to display a combined video stream from a client device associated with an active and/or current speaker and/or presenter of the video conference. For example, the combined video stream can include a background image 214 (e.g., a transparent background), one or more images representing one or more content items presentable by the speaker during the video conference (e.g., content item 216, which is displaying Presentation 1), the speaker's video stream (e.g., video stream 218, which is displaying Participant A's video stream), and/or one or more teleprompter notes associated with at least one of the one or more content items (e.g., teleprompter notes 226). In some embodiments, the combined video stream can be created using a camera driver of the client device associated with the speaker and provided to the video conference manager 122 to generate UI 200, or used by the video conferencing application hosted by the client device. Alternatively, the combined video stream can be created by the video conference manager 122 using one or more video streams provided by the client device and/or one or more content items provided by the client device or obtained from data store 110 and/or one or more other sources.

Combining the video stream include overlaying one or more images over the other. For example, in the combined video stream, the one or more images representing the one or more content items presentable by the speaker during the video conference can be overlaid over the background image, the speaker's video stream can be overlaid over at least a part of the background image, and/or the one or more teleprompter notes can be overlaid over at least a part of a content item of the one or more content items. For example, as illustrated in FIG. 2A and FIG. 2B, the combined video stream can include an image representing the content item 216 overlaid over the background image 214, the speaker's video stream 218 overlaid over a corner right portion of the content item 216, and the teleprompter notes 226 overlaid over a top center portion of the content item 216 (e.g., such that the speaker can read the teleprompter notes while maintaining eye contact with the other participants of the video conference by looking at the camera of the client device). In some embodiments, the teleprompter notes 226 can be overlaid as a semi-transparent overlay. For example, one or more red-green-blue (RGB) values of a set of pixels corresponding to the teleprompter notes 226 can be converted to a semi-transparent color so that the teleprompter notes appear semi-transparent. In some examples, the teleprompter notes 226 can be set to automatically scroll at a particular speed, which can be set by the speaker, as described in more detail with respect to FIG. 3.

The second region 220 can display a visual item corresponding to video data captured and/or streamed by a client device associated with Participant B. Third region 222 can display a visual item corresponding to video data captured and/or streamed by a client device associated with Participant C. As illustrated, the first region 224 can correspond to a "main region," e.g., an area in the UI 200 that is placed at or near the center or a focus area of the UI 200. In some embodiments, the second region 220 and the third region 222 can correspond to "thumbnail regions." A thumbnail region can refer to an area of the UI 200 that can be located along a side (e.g., a bottom side) of the UI 200. Similar to the main region, the thumbnail region is also associated with a video stream received from the client device and displays the video stream. However, the thumbnail regions spans a smaller area than the main region, thereby presenting images of the associated video stream in a relatively smaller scale than the main region. In some implementations, there can be more than one main region. In some implementations, each region is of the same or similar size as the size of each other region. In some embodiments, the first region 222 is relatively bigger than the second region 220 and the third region 222 to catch the attention of participants in the video conference (e.g., users of the client devices).

In some implementations, the video conference manager 122 can associate each region with a visual item corresponding to a video stream received from a client device. For example, the processing device can determine that the second region 220 is to display a visual item corresponding to a video stream from the client device of Participant B (e.g., based on an identifier associated with each client device and/or each participant). In some implementations, this can be done automatically without any user input specifying which visual item is to be displayed in the second region 220 in the UI 200.

In some implementations, the UI 200 can also include an options region 210 for providing selectable control UI elements (e.g., 210*a*, 210*b*, 210*c*, 210*d*, 210*e*, 210*f*) to adjust display settings (e.g., a size of each region, a number of regions, a selection of a video stream, etc.), invite additional users to participate, share content items, etc. For example, as illustrated in FIG. 2C, the UI 200 can include the control UI element 210*d* for sharing content items. In some embodiments, a participant (e.g., a speaker and/or Participant A of FIG. 2A) can identify one or more content items to share with other participants of the video conference in a presentation. Using FIG. 2A as an illustrative example, Participant A may want to identify (e.g., select) the content item 216 (e.g., Presentation 1) for presentation. Participant A can select (e.g., by using a mouse, cursor, and/or touchscreen of the client device of Participant A) the control UI element 210*d*. Upon selection of the control UI element 210*d*, another set of selectable control UI elements (e.g., 228, 230) can be provided in a region 226 of the UI 200 or in another UI of the client device. In some embodiments, Participant A can click on (e.g., by using a mouse, cursor, and/or touchscreen of the client device of Participant A) control UI element 230 (e.g., a plus sign, a button, or another selectable UI element) to select one or more content items to share (e.g., a presentation slide, a document, a multimedia item, a website, etc.). Each type of content item can be presented in the UI in, for example, a drop-down menu. In some embodiments, Participant A can click on (e.g., by using a mouse, cursor, and/or touchscreen of the client device of Participant A) control UI element 228 (e.g., a search bar) to enter a uniform resource locator (URL) or other type of link to a content item (e.g., a website, file, document, etc.) that Participant A wants to share. In some embodiments, in response to receiving Participant A's selection of the one or more content items to share, the one or more content items, as well as one or more teleprompter notes that are associated with the one or more content items, can be obtained via an application programming interface (API) to a content editing application, as described in detail with respect to FIG. 2A and FIG. 3.

FIG. 3 depicts a flow diagram of a method 300 for generating a virtual presentation stage for presentation in a UI of a video conference, in accordance with implementations of the present disclosure. Method 300 may be performed by processing logic that may include hardware (circuitry, dedicated logic, etc.), software (e.g., instructions run on a processing device), or a combination thereof. In one implementation, some or all the operations of method 300 may be performed by one or more components of system 100 of FIG. 1 (e.g., video conference platform 120, server 130 and/or video conference manager 122).

For simplicity of explanation, the method 300 of this disclosure is depicted and described as a series of acts. However, acts in accordance with this disclosure can occur in various orders and/or concurrently, and with other acts not presented and described herein. Furthermore, not all illustrated acts may be required to implement the method 300 in accordance with the disclosed subject matter. In addition, those skilled in the art will understand and appreciate that the method 300 could alternatively be represented as a series of interrelated states via a state diagram or events. Additionally, it should be appreciated that the method 300 disclosed in this specification are capable of being stored on an article of manufacture (e.g., a computer program accessible from any computer-readable device or storage media) to facilitate transporting and transferring such method to computing devices. The term "article of manufacture," as used herein, is intended to encompass a computer program accessible from any computer-readable device or storage media.

At block 310, the processing logic receives a first participant video stream (also referred to herein as "video stream") representing a participant (e.g., a first participant) of a set of participants of a video conference. In some implementations, the first participant video stream is received from a camera (e.g., camera 127A) of a client device (e.g., the client device 120A of FIG. 1) of the first participant of a set (e.g., a plurality) of client devices (e.g., the client devices 120A-120N and/or 140 of FIG. 1) of the set of participants of the video conference. In some embodiments, the first participant video stream can be captured from the camera using a camera driver. The first participant video stream can correspond to a series of images captured by the camera of the client device and subsequently encoded for transmission over a network in accordance with, for example, H.264 standard. In some embodiments, the video stream can be associated with an audio stream corresponding to audio data collected by a microphone of the client device and subsequently encoded (e.g., compressed and packetized) for transmission over a network. The audio data can be encoded according to a standard such as MP3, etc. In some embodiments, the processing logic can receive the audio streams and video streams as a composite stream. The composite stream is also referred to as a multiplex stream where segments of the audio streams and video streams are intermixed together.

At block 320, the processing logic creates a combined video stream (e.g., the combined video stream illustrated in region 224 of FIG. 2A). The combined video stream can include a background image (e.g., the background image 214 of FIG. 2A), one or more images that represent one or more content items that are presentable by the first participant during the video conference (e.g., the content item 216 of FIG. 2A), the first participant video stream received at block 310 (e.g., Participant A's video stream 218 in FIG. 2A), and/or one or more teleprompter notes that are associated with at least one of the one or more content items (e.g., the teleprompter notes 226 of FIG. 2A). In some embodiments, each content item can be a document, a spreadsheet, a set of slides, a multimedia content item, or any other content that the first participant may share with other participants of the video conference.

In some embodiments, the combining of the video stream is performed by a driver (e.g., a camera driver) of the camera of the first client device. In some embodiments, combining the video stream can include creating a set of layers. Each layer can include a particular content item, a participant (e.g., the speaker's) video stream, a background image, or one or more teleprompter notes. In some embodiments, each layer is an inline frame, e.g., a Hyper Text Markup Language (HTML) element that embeds the content item within another HTML element (e.g., a window). Each layer can be considered as a "window." In some implementations, the one or more images representing the one or more content items are overlaid over the background image in a first layer, the first participant video stream is overlaid over at least a part of the background image in another (e.g., second) layer, and/or the one or more teleprompter notes are overlaid over at least a part of a content item of the one or more content items in another (e.g., third) layer. In some embodiments, other combinations of layers are possible of the one or more content items, the background image, the first participant video stream, and the one or more teleprompter notes.

In some embodiments, overlaying the first participant's video stream over at least part of the background image includes using a machine learning model to identify a first set of pixels that correspond to one or more persons identified in the first participant's video stream, and a second set of pixels that correspond to the background image identified in the video stream. In some embodiments, the machine learning model can be trained to detect and segment one or more persons (e.g., human body parts) in a media item (e.g., in a video). The machine learning model can be a deep neural network, such as a convolutional neural network. Training the machine learning model can include training the machine learning model, using supervised learning, on an input dataset of images, where each image in the dataset is paired with a corresponding ground truth mask (e.g., a target output) that indicates the segmentation boundaries of human body parts (e.g., head, torso, arm, legs, etc.). In some embodiments, the video stream can be segmented, using the trained machine learning model, into a first layer including the first set of pixels (e.g., including the one or more persons identified in the video stream) and a second layer including the second set of pixels (e.g., including the background image identified in the video stream). For example, each frame of the video stream can be inputted into the machine learning model, and the machine learning model can output an image with a first set of pixels that includes one or more human body parts identified in each inputted frame, and an image with a second set of pixels that includes the background image identified in each inputted frame. In some embodiments, the processing logic can modify one or more red-green-blue (RGB) values of the second set of pixels to convert the color of the background image identified in the video stream into a transparent background image.

In some embodiments, the first participant can select the one or more content items to be shared with (e.g., presented to) the other participants of the video conference. The processing logic can receive, via a user interface (UI) on the first client device of the first participant, the first participant's input identifying the one or more content items. For example, as illustrated in FIG. 2A and FIG. 2C, the UI 200 can include the control UI element 210*d* for sharing content items. In some embodiments, a participant (e.g., a speaker and/or Participant A of FIG. 2A) can identify one or more content items to share with other participants of the video conference in a presentation. Participant A may want to identify (e.g., select) the content item 216 (e.g., Presentation 1) for presentation. Participant A can select (e.g., by using a mouse, cursor, and/or touchscreen of the client device of Participant A) the control UI element 210*d*. Upon selection of the control UI element 210*d*, another set of selectable control UI elements (e.g., 228, 230) can be provided in a region 226 of the UI 200 or in another UI of the client device. In some embodiments, Participant A can click on (e.g., by using a mouse, cursor, and/or touchscreen of the client device of Participant A) control UI element 230 (e.g., a plus sign, a button, or another selectable UI element) to select one or more content items to share (e.g., a presentation slide, a document, a multimedia item, a website, etc.). Each type of content item can be presented in the UI in, for example, a drop-down menu. In some embodiments, Participant A can click on (e.g., by using a mouse, cursor, and/or touchscreen of the client device of Participant A) control UI element 228 (e.g., a search bar) to enter a uniform resource locator (URL) or other type of link to a content item (e.g., a website, file, document, etc.) that Participant A wants to share.

In some embodiments, in response to receiving Participant A's selection of the one or more content items to share, the one or more content items, as well as one or more teleprompter notes that are associated with the one or more content items, can be obtained via an application programming interface (API) to a content editing application. In some implementations, the processing logic can obtain the set of content items via an appropriate application programming interface (API) to a content editing application. The content editing application can be an application that provides a set of tools for editing content items, such as a document editing application, a slide presentation editing application, a video editing application, etc. In some examples, the content editing application can be a web-based application with an API component that allows the client device to access the content editing application and obtain one or more content items from the content editing application. In some implementations, the processing logic can further obtain one or more teleprompter notes that are associated with one or more content items of the set of content items from the content editing application. The one or more teleprompter notes can be, for example, one or more sets of notes that the participant prepared to read from during presentation of the one or more content items during the video conference. As an example, the processing logic can obtain, via the API component of the content editing application, a slide presentation that was prepared by the participant using the content editing application. The processing logic can further obtain, via the API component, a set of teleprompter notes that are stored in a document or file related to the slide presentation and/or within the slide presentation on the content editing application. For example, a machine learning model can be trained to perform optical character recognition (OCR) and/or natural language processing (NLP) to identify relevant notes (e.g., the set of teleprompter notes) within documents and/or content items stored on the content editing application. For example, the machine learning model can be a deep neural network, such as a convolutional neural network, which can be trained using supervised learning on a labeled dataset containing images of characters or text. The machine learning model can thus be trained to map the input dataset containing images to corresponding labels of characters and/or texts. In some implementations, the machine learning model can be stored on the server 130 of FIG. 1 or can be stored as part of the client application of the client device.

At block 330, the processing logic provides, for display on the first client device of the first participant, a UI (e.g., a UI 124A of the UIs 124A-124N of FIG. 1). In some embodiments, the UI includes a set of regions to display a set of visual items, where each visual item corresponds to a video stream of a set of video streams from the set of client devices. In some embodiments, the UI can display a visual item that corresponds to the combined video stream created at block 320. In some embodiments, the UI can display the visual item corresponding to the combined video stream while the first participant is presenting at least one of the one or more content items to one or more other participants of the video conference.

In some embodiments, upon a selection of a control UI element in the UI by the first participant, the processing logic can modify a visual representation of at least one content item of the one or more content items. In some embodiments, modifying the visual representation of a content item can be performed by modifying the inline frame, e.g., the HTML element that embeds the content item within another HTML element (e.g., the window). For example, modifying the inline frame can include using cascading style sheets (CSS) to control and/or change one or more CSS properties of the inline frame, such as size, position, background, etc. In some embodiments, the client device can include event handling methods, such as JavaScript event handling methods, where various user interactions with UI elements and/or a mouse or cursor of the client device can control one or more of the aforementioned CSS properties of the inline frame. For example, the first participant can right click on a portion of a content item to add and/or delete one or more content items in the combined video stream, left click on a portion of a content item to modify a position of a layer relative to other layers and/or to modify a position of a content item in the combined video stream, right click on a portion of a content item and move it to modify a size of a content item in a layer in the combined video stream, use a scroll wheel to toggle between different layers or to toggle between different modes of presentation, double click on a portion of a content item to toggle between a full screen and standard view of the combined video stream, etc. In some embodiments, the processing logic can modify (e.g., edit, delete, add, etc.) at least one teleprompter note of the one or more teleprompter notes associated with at least one content item of the one or more content items, e.g., using a content editing application, as discussed above. In some embodiments, the one or more teleprompter notes can be set to automatically scroll at a particular speed in the combined video stream. In some embodiments, the particular speed can be controlled by the first participant (e.g., the speaker). For example, the first participant can click on at least a portion of the one or more teleprompter notes and use a scroll wheel to toggle and select among different speeds. Once the first participant selects a certain speed, the processing logic can set the one or more teleprompter notes to automatically scroll at the selected speed. In some embodiments, the speed can be changed at any time during the video conference. In some embodiments, the one or more teleprompter notes can be overlaid in the combined video stream as a semi-transparent overlay. For example, the processing logic can convert one or more red-green-blue (RGB) values of a set of pixels corresponding to the one or more teleprompter notes to a semi-transparent color so that the teleprompter notes appear semi-transparent.

Figure 4:
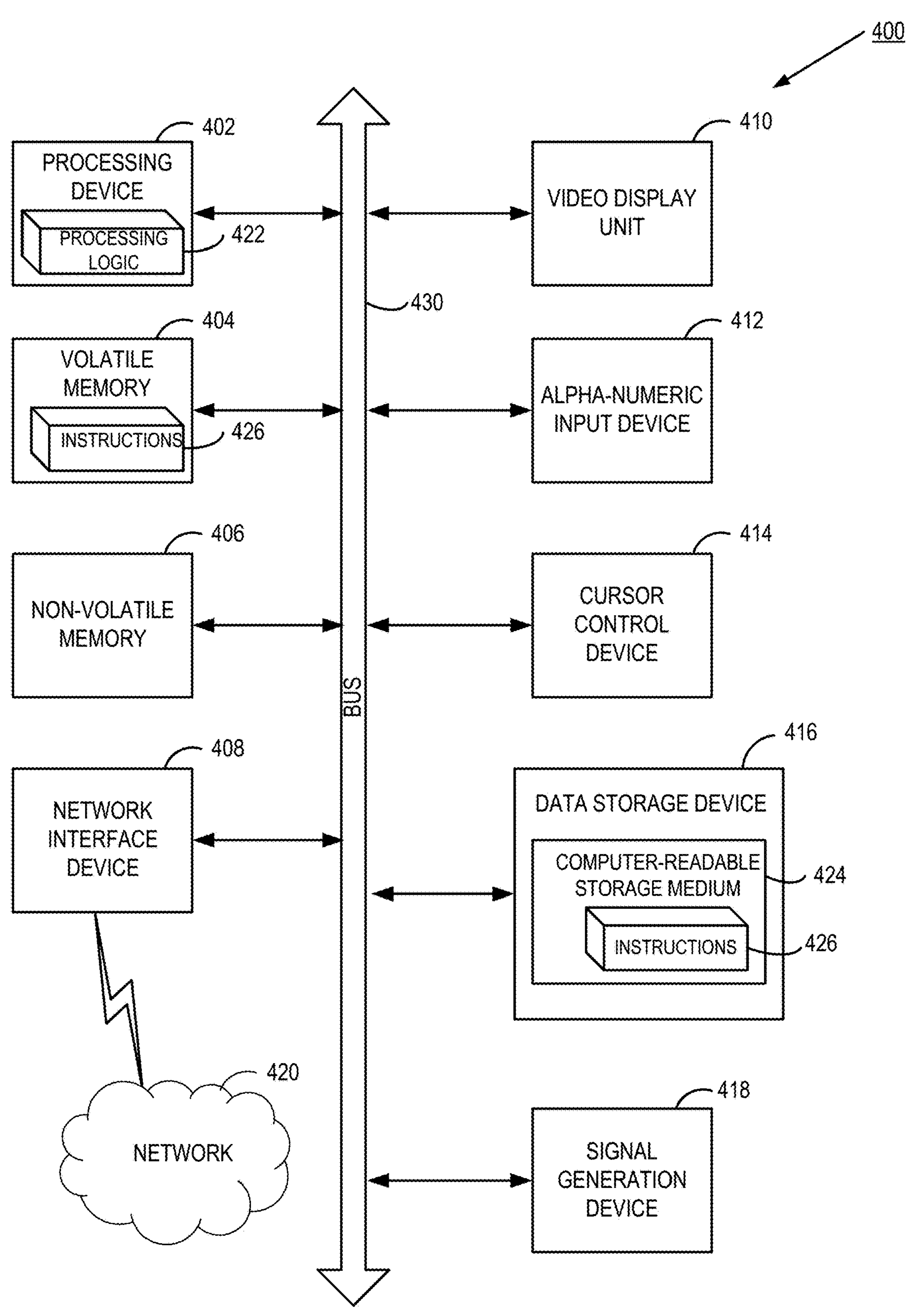
FIG. 4 is a block diagram illustrating an exemplary computer system, in accordance with implementations of the present disclosure.

FIG. 4 is a block diagram illustrating an exemplary computer system, in accordance with implementations of the present disclosure. The computer system 400 can be the server 130 or client devices 102A-N in FIG. 1. The machine can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processing device (processor) 402, a main memory 404 (e.g., read-only memory (ROM), flash memory, dynamic random access memory (DRAM) such as synchronous DRAM (SDRAM), double data rate (DDR SDRAM), or DRAM (RDRAM), etc.), a static memory 406 (e.g., flash memory, static random access memory (SRAM), etc.), and a data storage device 418, which communicate with each other via a bus 440.

Processor (processing device) 402 represents one or more general-purpose processing devices such as a microprocessor, central processing unit, or the like. More particularly, the processor 402 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 can also be one or more special-purpose processing devices such as an application specific integrated circuit (ASIC), a field programmable gate array (FPGA), a digital signal processor (DSP), network processor, or the like. The processor 502 is configured to execute instructions 405 (e.g., for generating a virtual presentation stage for presentation in a user interface of a video conference) for performing the operations discussed herein.

The computer system 400 can further include a network interface device 408. The computer system 400 also can include a video display unit 410 (e.g., a liquid crystal display (LCD) or a cathode ray tube (CRT)), an input device 412 (e.g., a keyboard, and alphanumeric keyboard, a motion sensing input device, touch screen), a cursor control device 414 (e.g., a mouse), and a signal generation device 420 (e.g., a speaker).

The data storage device 418 can include a non-transitory machine-readable storage medium 424 (also computer-readable storage medium) on which is stored one or more sets of instructions 405 (e.g., for generating a virtual presentation stage for presentation in a user interface of a video conference) embodying any one or more of the methodologies or functions described herein. The instructions can also reside, completely or at least partially, within the main memory 404 and/or within the processor 402 during execution thereof by the computer system 400, the main memory 404 and the processor 402 also constituting machine-readable storage media. The instructions can further be transmitted or received over a network 430 via the network interface device 408.

In one implementation, the instructions 405 include instructions for generating a virtual presentation stage for presentation in a user interface of a video conference. While the computer-readable storage medium 424 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," or "an implementation," means that a particular feature, structure, or characteristic described in connection with the implementation is included in at least one implementation. Thus, the appearances of the phrase "in one implementation," or "in an implementation," in various places throughout this specification can, but are not necessarily, referring to the same implementation, depending on the circumstances. Furthermore, the particular features, structures, or characteristics may be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component may be, but is not limited to being, a process running on a processor (e.g., digital signal processor), a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user may opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

receiving, from a camera of a first client device of a first participant of a plurality of participants of a video conference, a first participant video stream representing the first participant;

creating a combined video stream comprising a background image, one or more images representing one or more content items presentable by the first participant during the video conference, the first participant video stream, and one or more teleprompter notes associated with at least one of the one or more content items, wherein the combined video stream comprising the background image, the one or more images representing the one or more content items, the first participant video stream, and the one or more teleprompter notes is created using a driver of the camera of the first client device of the first participant; and providing, for display on the first client device of the first participant, a user interface (UI) comprising a visual item corresponding to the combined video stream while the first participant is presenting at least one of the one or more content items to one or more other participants of the video conference, wherein a location of the one or more teleprompter notes in the combined video stream is configured to enable the first participant to read the one or more teleprompter notes while appearing to look at the camera.

2. The method of claim 1, wherein the one or more images representing the one or more content items are overlaid over the background image in the combined video stream, the first participant video stream is overlaid over at least a part of the background image, and the one or more teleprompter notes are overlaid over at least a part of a content item of the one or more content items in the combined video stream.

3. The method of claim 1, further comprising:

receiving, via the UI, input of the first participant to identify the one or more content items; and obtaining, via an application programming interface (API) to a content editing application, the one or more content items and the one or more teleprompter notes associated with the at least one of the one or more content items.

4. The method of claim 1, wherein a content item of the one or more content items is one of a document, a spreadsheet, a set of slides, or a multimedia content item.

5. The method of claim 1, further comprising:

receiving, from one or more client devices associated with other participants of the video conference, one or more other participant video streams; and adding, to the UI displayed on the first client device of the first participant, one or more visual items corresponding to the one or more other participant video streams.

6. The method of claim 5, wherein a second UI displayed on each of the one or more client devices associated with the other participants of the video conference comprises a visual item corresponding to a second combined video stream comprising the background image, an image representing one of the one or more content items being presented by the first participant, and the first participant video stream, wherein the one or more teleprompter notes associated with the at least one of the one or more content items are not visible on the second UI displayed on each of the one or more client devices associated with the other participants of the video conference.

7. The method of claim 1, further comprising:

upon a selection of a control UI element in the UI by the first participant, modifying a visual representation of the at least one of the one or more content items; and modifying at least one teleprompter note of the one or more teleprompter notes associated with the at least one of the one or more content items.

8. The method of claim 1, wherein the one or more teleprompter notes are set to automatically scroll at a user-selectable scrolling speed.

9. A system comprising:

a memory device; and a processing device coupled to the memory device, the processing device to perform operations comprising:

receiving, from a camera of a first client device of a first participant of a plurality of participants of a video conference, a first participant video stream representing the first participant;

creating a combined video stream comprising a background image, one or more images representing one or more content items presentable by the first participant during the video conference, the first participant video stream, and one or more teleprompter notes associated with at least one of the one or more content items, wherein the combined video stream comprising the background image, the one or more images representing the one or more content items, the first participant video stream, and the one or more teleprompter notes is created using a driver of the camera of the first client device of the first participant; and providing, for display on the first client device of the first participant, a user interface (UI) comprising a visual item corresponding to the combined video stream while the first participant is presenting at least one of the one or more content items to one or more other participants of the video conference, wherein a location of the one or more teleprompter notes in the combined video stream is configured to enable the first participant to read the one or more teleprompter notes while appearing to look at the camera.

10. The system of claim 9, wherein the one or more images representing the one or more content items are overlaid over the background image in the combined video stream, the first participant video stream is overlaid over at least a part of the background image, and the one or more teleprompter notes are overlaid over at least a part of a content item of the one or more content items in the combined video stream.

11. The system of claim 9, wherein the processing device is to perform operations further comprising:

receiving, via the UI, input of the first participant to identify the one or more content items; and obtaining, via an application programming interface (API) to a content editing application, the one or more content items and the one or more teleprompter notes associated with the at least one of the one or more content items.

12. The system of claim 9, wherein a content item of the one or more content items is one of a document, a spreadsheet, a set of slides, or a multimedia content item.

13. The system of claim 9, wherein the processing device is to perform operations further comprising:

receiving, from one or more client devices associated with other participants of the video conference, one or more other participant video streams; and adding, to the UI displayed on the first client device of the first participant, one or more visual items corresponding to the one or more other participant video streams.

14. The system of claim 13, wherein a second UI displayed on each of the one or more client devices associated with the other participants of the video conference comprises a visual item corresponding to a second combined video stream comprising the background image, an image representing one of the one or more content items being presented by the first participant, and the first participant video stream, wherein the one or more teleprompter notes associated with the at least one of the one or more content items are not visible on the second UI displayed on each of the one or more client devices associated with the other participants of the video conference.

15. The system of claim 9, wherein the processing device is to perform operations further comprising:

upon a selection of a control UI element in the UI by the first participant, modifying a visual representation of the at least one of the one or more content items; and modifying at least one teleprompter note of the one or more teleprompter notes associated with the at least one of the one or more content items.

16. The system of claim 9, wherein the one or more teleprompter notes are set to automatically scroll at a user-selectable scrolling speed.

17. A non-transitory computer readable storage medium comprising instructions for a server that, when executed by a processing device, cause the processing device to perform operations comprising:

receiving, from a camera of a first client device of a first participant of a plurality of participants of a video conference, a first participant video stream representing the first participant;

creating a combined video stream comprising a background image, one or more images representing one or more content items presentable by the first participant during the video conference, the first participant video stream, and one or more teleprompter notes associated with at least one of the one or more content items, wherein the combined video stream comprising the background image, the one or more images representing the one or more content items, the first participant video stream, and the one or more teleprompter notes is created using a driver of the camera of the first client device of the first participant; and providing, for display on the first client device of the first participant, a user interface (UI) comprising a visual item corresponding to the combined video stream while the first participant is presenting at least one of the one or more content items to one or more other participants of the video conference, wherein a location of the one or more teleprompter notes in the combined video stream is configured to enable the first participant to read the one or more teleprompter notes while appearing to look at the camera.

18. The non-transitory computer readable storage medium of claim 17, wherein the one or more images representing the one or more content items are overlaid over the background image in the combined video stream, the first participant video stream is overlaid over at least a part of the background image, and the one or more teleprompter notes are overlaid over at least a part of a content item of the one or more content items in the combined video stream.

19. The non-transitory computer readable storage medium of claim 17, wherein the processing device is to perform operations further comprising:

receiving, via the UI, input of the first participant to identify the one or more content items; and obtaining, via an application programming interface (API) to a content editing application, the one or more content items and the one or more teleprompter notes associated with the at least one of the one or more content items.

20. The non-transitory computer readable storage medium of claim 17, wherein the one or more teleprompter notes are set to automatically scroll at a user-selectable scrolling speed.

* * * * *